United States Patent
Tomas et al.

(10) Patent No.: US 11,041,483 B2
(45) Date of Patent: Jun. 22, 2021

(54) METHODS OF OPERATING A WIND TURBINE

(71) Applicant: General Electric Company, Schenectady, NY (US)

(72) Inventors: Santiago Tomas, Barcelona (ES); Darren Danielsen, Greenville, SC (US); Francesc Xavier Sanz, Barcelona (ES); Ingo Paura, Salzbergen (DE); Samuel Davoust, Garching (DE); Pranav Agarwal, Shelton, CT (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 16/216,206

(22) Filed: Dec. 11, 2018

(65) Prior Publication Data

US 2019/0178231 A1 Jun. 13, 2019

(30) Foreign Application Priority Data

Dec. 12, 2017 (EP) .................................... 17382843

(51) Int. Cl.
*F03D 17/00* (2016.01)
*F03D 7/02* (2006.01)
*F03D 80/50* (2016.01)

(52) U.S. Cl.
CPC .............. *F03D 17/00* (2016.05); *F03D 7/02* (2013.01); *F03D 7/0292* (2013.01); *F03D 80/50* (2016.05);
(Continued)

(58) Field of Classification Search
CPC .......... F03D 7/02; F03D 7/0292; F03D 7/043; F03D 7/046; F03D 17/00; F05B 2270/109;
(Continued)

(56) References Cited

U.S. PATENT DOCUMENTS 7,822,560 B2 * 10/2010 LeMieux ................ F03D 7/042
290/44
2007/0229248 A1 10/2007 Mott et al.
(Continued)

FOREIGN PATENT DOCUMENTS

EP 2320077 A1 5/2011
EP 2886853 A1 6/2015
(Continued)

OTHER PUBLICATIONS

Thomsen, Kenneth; Sorensen, Poul, "Fatigue loads for wind turbines operating in wakes", 1999, Journal of Wind Engineering and Industrial Aerodynamics, vol. 80, pp. 121-136. (Year: 1999).*
(Continued)

*Primary Examiner* — Woody A Lee, Jr.
*Assistant Examiner* — Eric A Lange
(74) *Attorney, Agent, or Firm* — Dority & Manning, P.A.

(57) ABSTRACT

A method of operating a wind turbine and a method of determining fatigue in a wind turbine component are provided. The method of operating a wind turbine comprises determining a reference accumulated fatigue, determining an operational time, obtaining a partial load indicator, determining a real accumulated fatigue, comparing the real accumulated fatigue and the reference accumulated fatigue and controlling the operation of the wind turbine. The method of determining fatigue in a wind turbine component comprises determining an operational time, obtaining wind speed, obtaining turbulence intensity, determining a time for each combination of wind speed and turbulence intensity and determining a real accumulated fatigue. In a further aspect, this is also provided a wind turbine controller configured to perform any of the methods herein disclosed.

16 Claims, 6 Drawing Sheets

(52) U.S. Cl.
CPC ..... *F05B 2270/109* (2013.01); *F05B 2270/32* (2013.01); *F05B 2270/332* (2013.01)

(58) Field of Classification Search
CPC ............ F05B 2270/32; F05B 2270/332; F05B 2270/1095; F05B 2270/402; F05B 2270/50; F05B 2270/708
See application file for complete search history.

(56) References Cited

U.S. PATENT DOCUMENTS

| | | | | |
|---|---|---|---|---|
| 2011/0018271 A1* | 1/2011 | Karikomi | ............. | F03D 7/0292 290/44 |
| 2013/0062880 A1 | 3/2013 | Bowyer et al. | | |
| 2014/0248123 A1 | 9/2014 | Turner et al. | | |
| 2014/0288855 A1* | 9/2014 | Deshpande | ........... | F03D 7/0292 702/34 |
| 2015/0167637 A1* | 6/2015 | Kooijman | ............. | F03D 7/0292 416/1 |
| 2015/0176569 A1* | 6/2015 | Karikomi | ............. | F03D 7/0292 702/34 |
| 2017/0335829 A1* | 11/2017 | Pedersen | ............... | F03D 7/0224 |

FOREIGN PATENT DOCUMENTS

| | | | | |
|---|---|---|---|---|
| JP | 2005/240785 A | | 9/2005 | |
| JP | 2005240785 A | * | 9/2005 | |
| WO | WO-2017000957 A1 | * | 1/2017 | ........... F03D 7/0292 |

OTHER PUBLICATIONS

European Search Report Corresponding to EP173828435 dated Dec. 6, 2018.

* cited by examiner

METHODS OF OPERATING A WIND TURBINE

FIELD OF THE INVENTION

Embodiments of the present disclosure relate to methods of operating a wind turbine, and more particularly to methods of operating a wind turbine in view of fatigue damage in one or more wind turbine components.

BACKGROUND OF THE INVENTION

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

A variable speed wind turbine may typically be controlled by varying the generator torque and the pitch angle of the blades. As a result, aerodynamic torque, rotor speed and electrical power generated will vary.

Wind turbines and wind turbine components may be designed having a design lifetime in mind (e.g. 20 years). This means that a wind turbine is expected to be decommissioned after 20 years of operation. In an ideal scenario, all of the wind turbine components or a large number of the wind turbine components reach the end of their individual lifetime at substantially the same moment, i.e. at the end of the wind turbine's lifetime. In this case, none of the wind turbine components is overdimensioned. Each of the components is dimensioned correctly, thus reducing weight and cost of the wind turbine.

However, in reality, a wind turbine will not always perform exactly according to expectations, as e.g. the wind conditions during actual operation may be different from the expected wind conditions. Therefore, a wind turbine may be subjected to higher loads or lower loads to those than the wind turbine was designed for. This may happen when the wind conditions of the site measured during a period of time before the installation of the wind turbine differ from the real wind conditions that the wind turbine is subjected to. These differences may be produced for example by a new object erected in front of the wind turbine(s) modifying the wind conditions, e.g. a new wind farm installed in front of a previous wind farm. In addition, the measurement campaign carried out during a relatively short time before the wind farm installation may not reflect all the wind conditions that the wind turbine may be subjected to during its lifetime.

Such wind condition differences may lead to a wind turbine not reaching its design life which may require repairing a component or an early decommissioning. Alternatively, the differences from real wind conditions to the expected wind conditions may also lead to subjecting the wind turbine to lower loads than expected. Loads on the wind turbine may be modified by controlling e.g. the angle of pitch so as to maximize or minimize the output power. Maximizing the output power generally requires the blades capturing higher energy which inevitably leads to higher loads on the wind turbine.

Wind turbines are generally designed to withstand both extreme conditions, e.g. a wind gust, and cyclic loads with a magnitude lower than designed loads. These cyclic loads or fatigue loads may cause a failure of a component. In some cases, fatigue loads may be the most important loads when designing a wind turbine or a specific wind turbine component, e.g. a wind turbine tower. Therefore, determining the real fatigue damage in a wind turbine or in wind turbine component may enable increasing the lifetime of the wind turbine or the wind turbine component or re-scheduling maintenance operations.

SUMMARY OF THE INVENTION

In a first aspect, a method of operating a wind turbine is provided. The method comprises determining a reference accumulated fatigue of at least one wind turbine component, determining an operational time of the at least one wind turbine component comprising load obtaining periods and obtaining a partial load indicator from the at least one wind turbine component for each of the load obtaining periods. Furthermore, the method comprises determining a real accumulated fatigue in the at least one wind turbine component comprising obtaining an accumulated load indicator by adding the partial load indicators of each of the load obtaining periods. The method further comprises comparing the real accumulated fatigue and the reference accumulated fatigue and controlling the operation of the wind turbine based at least on a result of comparing the real accumulated fatigue and the reference accumulated fatigue.

In this aspect, the wind turbine operation is adjusted according to a result of comparing the real accumulated fatigue and the reference accumulated fatigue, i.e. determining whether the at least wind turbine component has more or less real accumulated fatigue than expected. Accordingly, the wind turbine availability may be improved by for example planning maintenance operations on wind turbine components having a greater real accumulated fatigue than the reference accumulated fatigue at design lifetime, e.g. a threshold value of the theoretical accumulated fatigue determined at design lifetime, or extending the lifetime of wind turbine components having less real accumulated fatigue than the reference accumulated fatigue at design lifetime, e.g. a threshold value of the theoretical accumulated fatigue expected at the design lifetime of the component. As a result, the operation of the wind turbine may be optimized and the cost of energy (COE) may also be reduced.

BRIEF DESCRIPTION OF THE DRAWINGS

Non-limiting examples of the present disclosure will be described in the following, with reference to the appended drawings, in which.

DETAILED DESCRIPTION

In these figures the same reference signs have been used to designate matching elements.

Operational time of a component herein shall mean a time that a component has been operating.

Design lifetime of a component shall mean the expected maximum lifetime of a component.

Reference accumulated fatigue herein shall more particularly mean an accumulation of theoretical fatigue loads (with or without a safety factor) that a wind turbine (component) is expected to experience.

Reference accumulated fatigue at design lifetime shall mean the accumulated theoretical fatigue loads (with or without a safety factor) that a wind turbine (component) is expected to withstand during its design lifetime.

Reference accumulated fatigue trend shall mean a curve or line indicating an accumulation of theoretical expected fatigue loads (with or without a safety factor) from a beginning of operation of a wind turbine (component) until the design lifetime.

Reference accumulated fatigue at operational time shall mean the accumulated theoretical expected fatigue loads (with or without a safety factor) during the time that a wind turbine (component) has been operating.

Real accumulated fatigue is a calculation or estimation of the actual fatigue loads that a wind turbine (component) has been subjected to during its operational time.

Figure 1:
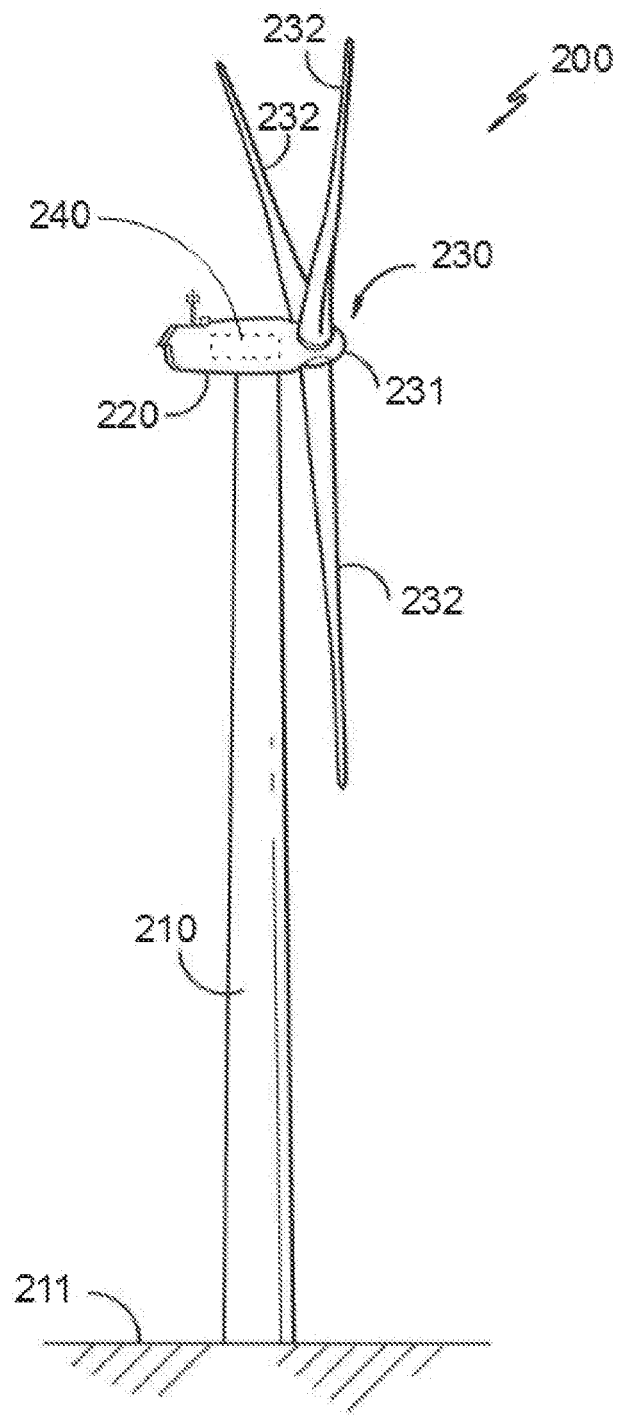
FIG. 1 illustrates a perspective view of a wind turbine according to one example.

FIG. 1 illustrates a perspective view of one example of a wind turbine 200. As shown, the wind turbine 200 includes a tower 210 extending from a support surface 211, a nacelle 220 mounted on the tower 210, and a rotor 230 coupled to the nacelle 220. The rotor 230 includes a rotatable hub 231 and at least one rotor blade 232 coupled to and extending outwardly from the hub 231. For example, in the illustrated embodiment, the rotor 230 includes three rotor blades 232. However, in an alternative embodiment, the rotor 230 may include more or less than three rotor blades 232. Each rotor blade 232 may be spaced about the hub 231 to facilitate rotating the rotor 230 to enable kinetic energy to be transferred from the wind into usable mechanical energy, and subsequently, electrical energy. For instance, the hub 231 may be rotatably coupled to an electric generator 221 (FIG. 2) positioned within the nacelle 220 to permit electrical energy to be produced.

The wind turbine 200 may also include a wind turbine controller 240 centralized within the nacelle 220. However, in other examples, the wind turbine controller 240 may be located within any other component of the wind turbine 200 or at a location outside the wind turbine. Further, the controller 240 may be communicatively coupled to any number of components of the wind turbine 200 in order to control the operation of such components and/or to determine the real accumulated fatigue of such components. In some examples, the controller may be further configured to perform a maintenance operation on a wind turbine component. In some examples, the wind turbine controller may be communicatively coupled to sensors for obtaining wind speed or turbulence intensity. The wind turbine controller will be explained in further detail below.

Figure 2:
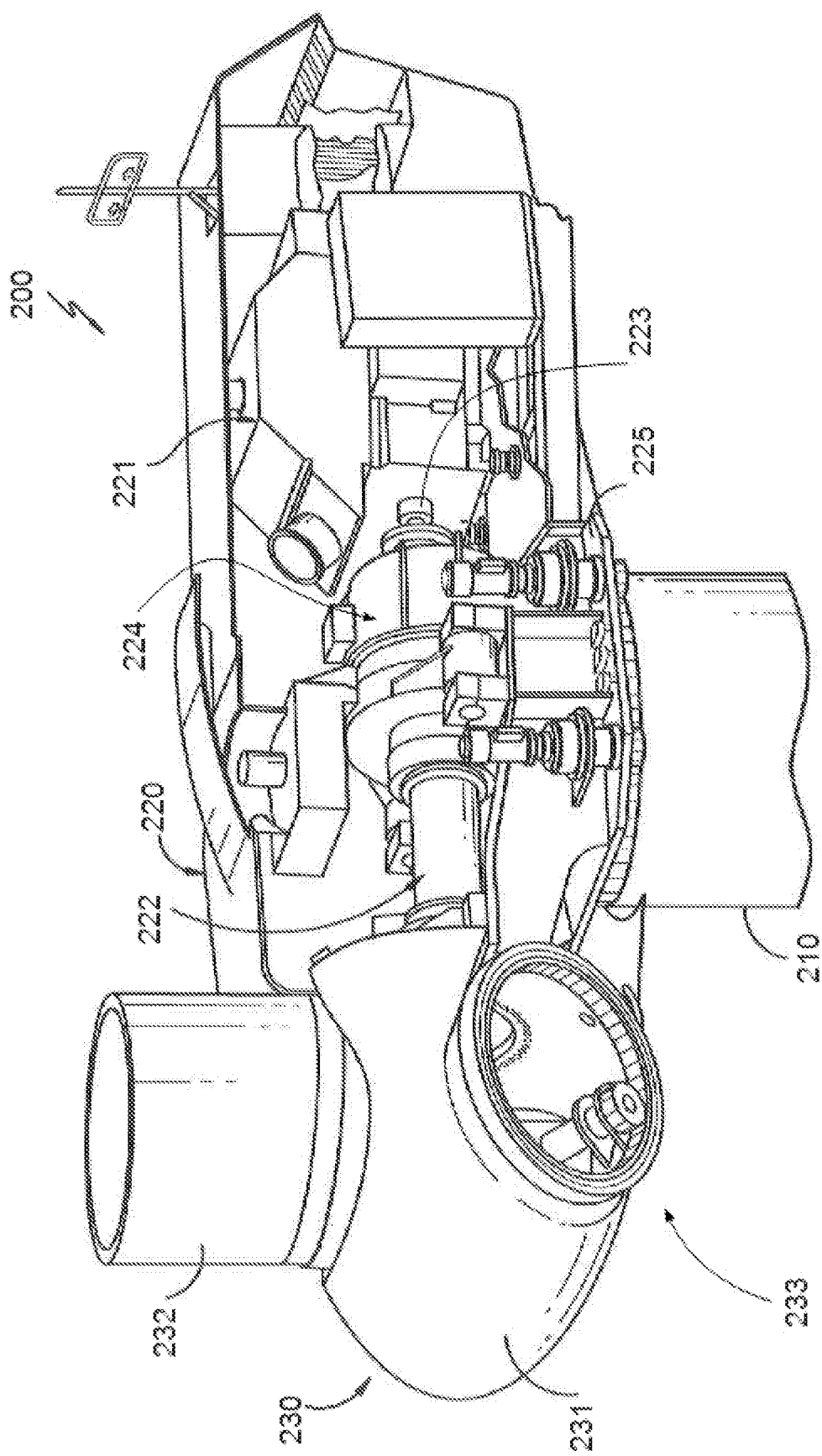
FIG. 2 illustrates a detailed, internal view of a nacelle of a wind turbine according to one example.

FIG. 2 illustrates a simplified, internal view of one example of the nacelle 220 of the wind turbine 200 of the FIG. 1. As shown, the generator 221 may be disposed within the nacelle 220. In general, the generator 221 may be coupled to the rotor 230 of the wind turbine 200 for generating electrical power from the rotational energy generated by the rotor 230. For example, the rotor 230 may include a main rotor shaft 222 coupled to the hub 231 for rotation therewith. The generator 221 may then be coupled to the rotor shaft 222 such that rotation of the rotor shaft 222 drives the generator 221. For instance, in the illustrated embodiment, the generator 221 includes a generator shaft 223 rotatably coupled to the rotor shaft 222 through a gearbox 224. It should be appreciated that the rotor shaft 222, gearbox 223, and generator 221 may generally be supported within the nacelle 220 by a support frame or bedplate 225 positioned atop the wind turbine tower 210.

Blades 232 are coupled to the hub 231 with a pitch bearing in between the blade 232 and the hub 231 and may perform a relative rotational movement with respect to the hub 231 when the pitch system 233 is actuated.

Figure 3:
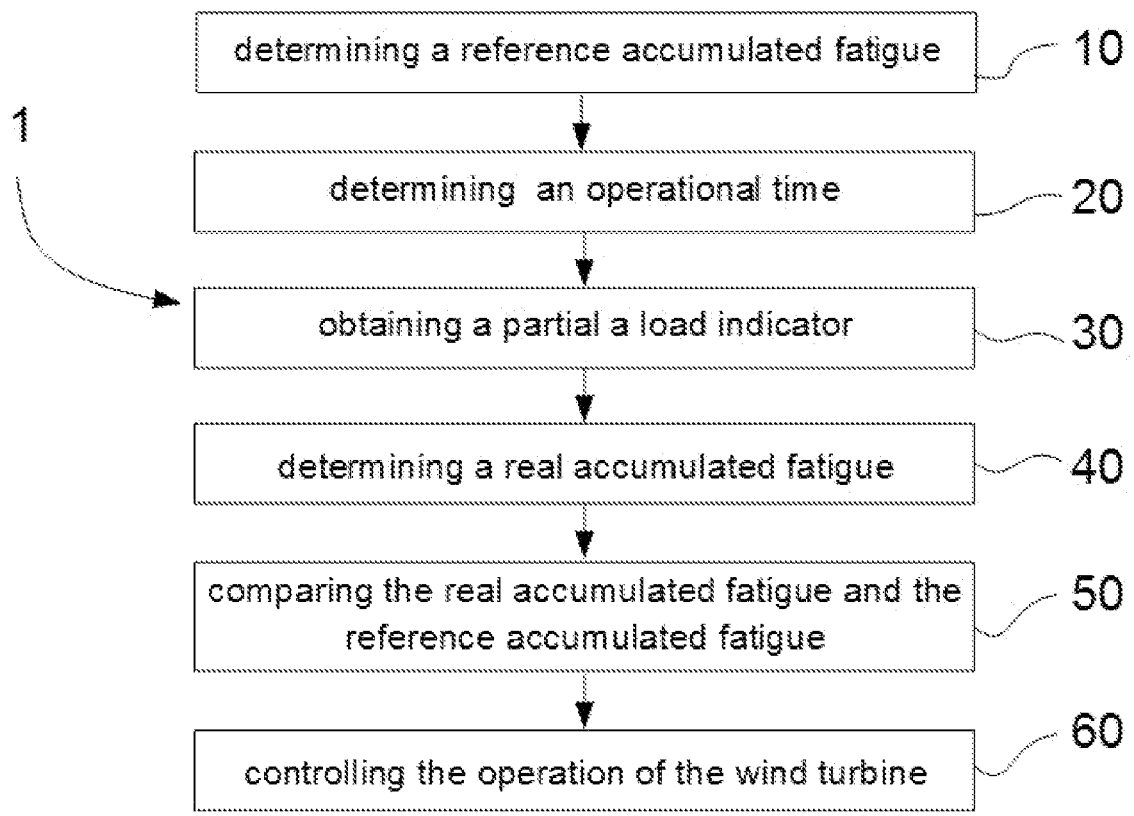
FIG. 3 shows a flow diagram of a method of operating a wind turbine according to an example.

FIG. 3 is a flow diagram of a method of operating 1a wind turbine 200 according to one example.

At block 10 a reference accumulated fatigue of at least one wind turbine component is determined. Such a reference accumulated fatigue shall more particularly mean an accumulation of theoretical fatigue loads that the at least one wind turbine component is expected to experience.

In some examples, the reference accumulated fatigue may comprise a safety factor, e.g. a threshold value of the theoretical accumulated fatigue of the at least one wind turbine component. According to this aspect, a real accumulated fatigue may be compared to a reference accumulated fatigue.

The reference accumulated fatigue, and consequently the theoretical accumulated fatigue, is based on theoretical fatigue simulations performed for designing and/or analyzing the structural behavior of the wind turbine, and its components. For example, shape and material of the components may be taken into account for simulating the reference accumulated fatigue.

In some examples, these simulations may take into account a specific site, i.e. considering specific expected or design wind conditions. In some of these examples, the reference accumulated fatigue may be determined by taking into account the time during which the wind turbine is expected to be working under several combinations of wind speed and turbulence intensity. These wind speeds and turbulence intensities may be obtained from a wind site measurement campaign or from other empirical measurements.

A reference accumulated fatigue at design lifetime may be obtained, e.g. a threshold value of the theoretical accumulated fatigue calculated at the design lifetime. According to this aspect, the reference accumulated fatigue at design lifetime may be used for determining where the real accumulated fatigue of the at least one wind turbine component is with respect to the fatigue design limit, i.e. the theoretical accumulated fatigue at design lifetime. For example, if the design lifetime of a component is 20 years, the reference accumulated fatigue at design lifetime is the accumulated theoretical fatigue loads (with or without a safety factor) that the wind turbine component is expected to withstand during these 20 years.

In some examples, a reference accumulated fatigue trend may be obtained. The reference accumulated fatigue trend is a curve or line indicating an accumulation of theoretical expected fatigue loads that a wind turbine component is expected to withstand during its design lifetime, i.e. from a beginning of operation of the component until the design lifetime. This curve or line indicates the evolution of the reference accumulated fatigue during the design lifetime. Accordingly, the curve or line comprises the reference accumulated fatigue at design lifetime. The reference accumulated fatigue trend may comprise a safety factor.

In some examples, a reference accumulated fatigue trend may be determined by interpolating the reference accumulated fatigue at design lifetime. In other examples, a reference accumulated fatigue trend may be determined by simulations.

From a reference accumulated fatigue trend, a reference accumulated fatigue may thus be determined at any time during the design lifetime. Therefore, a reference accumulated fatigue at operational time, i.e. the time that a component has been operating, for example 7 years, may be determined from this curve or line, i.e. from the reference accumulated fatigue trend. In these examples, a reference accumulated fatigue at operational time may thus be determined based on the operational time and on the reference accumulated fatigue trend.

Such a theoretical accumulated fatigue for operational time means the accumulated fatigue expected for a wind turbine component during the operational time.

In some examples, the theoretical accumulated fatigue and the reference accumulated fatigue may be the same. In some examples, the reference accumulated fatigue at design lifetime may correspond to a value of between 80%-100% of the theoretical accumulated fatigue at design lifetime.

Determining an operational time of at least one wind turbine component is represented at block 20. The operational time comprises load obtaining periods. At block 30, obtaining a partial load indicator from the at least one wind turbine component for each of the load obtaining periods is represented. During each of the load obtaining periods a load indicator may be obtained, therefore each of the load indicators obtained in each load obtaining periods is a partial load indicator. Such a partial load indicator may be obtained by any of the methods described below e.g. by obtaining wind speed and turbulence intensity and determining a time for each combination of wind speed and turbulence intensity or by estimating loads from a wind turbine controller. Block 40 represents determining the accumulated fatigue, i.e. the real time accumulated fatigue, and comprises obtaining an accumulated load indicator by adding the partial load indicators of each of the load obtaining periods. The accumulated load indicator represents the accumulation of all the partial load indicators which have been obtained in the load obtaining periods, i.e. the accumulated load indicator during the operational time.

This real accumulated fatigue may be determined by different methods. For example, the accumulated fatigue may be calculated by determining an equivalent fatigue load based at least on the obtained accumulated load indicator from the at least one wind turbine component. This equivalent fatigue load may be determined by different methods. In this aspect, equivalent fatigue loads determined in different load obtaining periods during the operational time are added. Then, a real time accumulated fatigue may be obtained for the operational time.

At block 50, the accumulated fatigue, i.e. determined from the real loads, and the reference accumulated fatigue are compared. Then, at block 60, the operation of the wind turbine is controlled based at least on a result of such a comparison.

At block 20, the operational time from at least one wind turbine component is determined. The operational time is defined as the time in which a component has been working. The operational time generally coincides with total time in which a component has been working since its installation. However, the operational time may be reset if a specific maintenance operation has been performed, e.g. replacing the element of the wind turbine component which is subjected to fatigue loads. If a component is replaced, the operational time of this component is accordingly reset. In some examples, the maximum operational time of a component may be 20 years.

The operational time comprises load obtaining periods, which are the periods wherein partial loads indicators are obtained. A load obtaining period may be for example from 1 minute to 120 minutes, specifically about 10 minutes. The total time of the load obtaining periods coincide with the operational time of the component.

If different components are monitored, the operational time and the fatigue load may be different for each of them, e.g. one component may have been replaced after 20.000 hours of operation, and then, after replacing the component, the operational time would start from 0, and another component may still be working after 40.000 hours of operation.

At block 30 a partial load indicator from at least one wind turbine component for each of the load obtaining periods is obtained. In some examples, a partial load indicator may be obtained from any of the wind turbine components. At least one wind turbine component may be for example a wind turbine blade, a hub, a tower, a gearbox or a main shaft. In some examples, obtaining a partial load indicator may comprise obtaining loads from a wind turbine component. Loads may also be obtained only from a portion of a wind turbine component such as from a tower base or from a blade root attachment.

In some examples, obtaining a partial load indicator from at least one wind turbine component may comprise measuring loads on the at least wind turbine component with a sensor.

For example, the at least wind turbine component may be the tower, at least one rotor blade, a hub, the drive train or the pitch system. Sensors for measuring loads may be strain gauges, accelerometers or the like. The sensors for measuring loads in these components could be mounted directly on or in the components. For a rotor blade, e.g. a flapwise and/or an edgewise bending moment may be determined from these measurements. For the tower, a measured load may be e.g. a fore-aft bending moment at the bottom of the tower. Alternatively or additionally, a side-to-side bending moment could be measured. For a drive train, a bending load in a rotor shaft or at a location in a gearbox could be measured. For pitch systems, one or more loads of a pitch motor could be sensed. A time-series of data for the selected loads in the selected components may thus be obtained.

Alternatively, obtaining a partial load indicator from at least one wind turbine component may comprise estimating loads on the at least one wind turbine component. Loads may be estimated by the wind turbine controller based on operational variables of the wind turbine in combination with measured external conditions In some examples, loads may be estimated, e.g. by the wind turbine controller, based on one of a pitch angle, an electrical power output, a rotational speed of a wind turbine rotor and a torque of a wind turbine rotor. In some examples, measuring the power output of the generator and the pitch angle of the blades allows to determine loads applied to the wind turbine. Then, after correlating these loads, e.g. by the wind turbine controller, loads applied to a wind turbine component may be estimated. Loads on the wind turbine may alternatively be estimated from the pitch angle and the rotational speed of the wind turbine rotor. In other examples, loads on the wind turbine may be obtained from the torque and the rotational speed of the wind turbine rotor.

Estimating loads on the wind turbine by the wind turbine controller and then calculating how these loads affect the at least one wind turbine component, provides a reliable method for obtaining a load indicator from a wind turbine component, e.g. loads from a wind turbine component. In this aspect, as loads are indirectly obtained, providing load sensors in the component for directly measuring loads is no longer necessary. Load sensors like strain gauges may need to be replaced each 6-24 months and to be calibrated periodically. In addition, installing strain gauges in every component to be monitored may generally require expertise and is very labor intensive. Moreover, loads are only measured in those components having a strain gauge. Measuring loads may thus be relatively expensive. Therefore, estimating loads on the at least one wind turbine component enhances reliability and stability of obtaining loads from the at least one wind turbine component. Moreover, these operational parameters are generally measured in all wind turbines, and thus no additional sensors may be needed.

In some examples, load sensors e.g. strain gauges, may be installed in some components to be monitored during the first months of the operation of the wind turbine, e.g. during the first 6 months, for calibrating how the wind turbine controller estimates the wind loads.

In some other examples, loads on a wind turbine component, or on some components, may be obtained from directly measuring loads, while loads on another wind turbine component, or on some others components, may be obtained from estimating loads.

In further examples, obtaining a partial load indicator from at least one component during a predetermined period of time may comprise obtaining wind speed and turbulence intensity, and then calculating loads by e.g. performing aeroelastic simulations, on the at least one component during a load obtaining period based at least on said wind speed and wind turbulence.

In these examples, obtaining the wind speed may comprise determining the wind speed from at least one of the pitch angle, an electrical power output, a rotational speed of the wind turbine rotor a torque of a wind turbine rotor. Therefore, the wind speed may be obtained by the wind turbine controller from a wind turbine operational parameter. Alternatively or additionally, wind speed may be directly measured by a wind sensor.

In some examples, turbulence intensity may be obtained by measuring the turbulence intensity with a turbulence sensor. A LIDAR may be an example of a turbulence sensor. Alternatively, turbulence intensity may be obtained from the variations of the rotational speed of the wind turbine rotor or from the variations of the rotational speed of the generator rotor. A wind turbine controller may determine from the variations of the rotational speed, e.g. ripples, the turbulence intensity.

In some other examples, turbulence intensity may be obtained from series of anemometers arranged at different heights. Such series of anemometers may be arranged on the wind turbine tower or on a measurement mast installed in a wind farm. A measurement mast having several anemometers may determine the turbulence of the wind affecting the wind farm. Then, a wind farm control or a wind turbine controller of each of the wind turbines of the wind farm may calculate the turbulence intensity which affects to each of the wind turbines. This calculation may take into account the position of each wind turbine and how some wind turbines affect the wind received by others wind turbines e.g. wakes.

After obtaining the wind speed and the turbulence intensity, the wind turbine controller may calculate loads on the wind turbine component(s) during a load obtaining period, e.g. by means of aeroelastic simulations. Such a load calculation may comprise determining a time during which the wind turbine is subjected to each combination of wind speed and turbulence intensity during the load obtaining period. Then, a load indicator may be obtained from the at least one wind turbine component or from several wind turbine components.

In these examples, the time during which a wind turbine component is operating under a combination of wind speed and turbulence intensity during the whole operational time or during a specific load obtaining period may be calculated using a matrix and/or a look-up table. Once the time of each wind speed and turbulence is determined, loads on wind turbine components may be obtained in a similar way as obtained using a predefined Weibull distribution for a given wind speed as described in IEC 64100-1 ed. 4. However, instead of using a predefined Weibull distribution, real time wind speed and turbulence intensity are used as inputs. Accordingly, loads are more precisely calculated.

In this aspect, determining the total time during which the wind turbine is operating under a specific combination of wind speed and turbulence intensity, indicates the loads that the wind turbine have been subjected to during the total time of the load obtaining periods, i.e. the operational time of the component. Therefore, determining the time during which a wind turbine is operating under a specific combination of at least wind speed and turbulence intensity may be a load indicator from at least one wind turbine component.

According to this aspect, aerolastic simulations may be used for determining loads for a given combination of wind speed, turbulence intensity and time of this combination. These simulations may be performed in advanced. For example, during a design phase several combinations of time, wind speed and turbulence intensity may be simulated in advanced for estimating loads on a wind component when the wind component is subjected to one of these combinations.

In addition to the wind speed and turbulence intensity, wind shear data and/or length scale turbulence may be obtained. Wind shear may be defined as the variation of wind speed along a height above the ground level. Length scale turbulence may be defined as the wavelength of the turbulence. In this aspect, time during which a wind turbine component is operating under each combination of wind speed, turbulence intensity and wind shear data and/or length scale turbulence may be calculated. Consequently, a load indicator, e.g. loads on a wind turbine component, may be more accurately determined.

In some examples, wind shear may be obtained from series of anemometers arranged at different heights. Such series of anemometers may be arranged on a measurement mast installed in a wind farm. Alternatively, a LIDAR may be used for obtaining wind shear data.

In some examples, length scale turbulence may be obtained from a measurement mast. The length scale turbulence of the wind may be obtained by analyzing the frequency of the wind speed determined by the anemometers of the measurement mast. As in obtaining a turbulence intensity, the length scale turbulence affecting a wind turbine may be calculated from the length scale obtained by the measurement mast, i.e. obtained from the wind farm, and derived for each wind turbine considering the wind farm configuration, e.g. the position of each wind turbine, wakes affecting each wind turbine or other structures affecting the wind flow. Alternatively, a LIDAR may be used for obtaining wind shear data.

In offshore applications, additionally to the wind conditions, water conditions may also be taken into account. Wind direction and wave direction may be different in an offshore wind turbine. As the frequency and/or the magnitude of loads produced by the wind conditions and by the water conditions may be different, these loads may affect the wind turbine component in a different manner. For taking into account these aspects, a wave direction, a wave height, wave energy, wave frequency or tide may be obtained. A time for each combination of wind parameters, e.g. wind speed and turbulence intensity, and water parameters may be determined. According to this aspect JONSWAP (Joint North Sea Wave Project) spectrum may be determined. The JONSWAP spectrum is an empirical relationship that defines the distribution of wave energy with wave frequency within the ocean. The JONSWAP spectrum may be obtained by a buoy. In addition, other water parameters may also be obtained by a buoy.

Therefore, obtaining a partial load indicator from the at least one wind turbine component may comprise obtaining a water parameter comprising at least one of a wave direction, JONSWAP spectrum, a wave height, wave frequency and tide; a calculating loads of the at least one wind turbine component during a load obtaining period is further based on the obtained water parameter.

In this aspect, the time during which a wind turbine component is operating under each combination of a wind speed, turbulence intensity and/or wind shear data and/or length scale turbulence and/or wave direction and/or JONSWAP spectrum and/or wave height and/or wave frequency and/or tide may be calculated. This is to say, that calculating loads on the least one wind turbine component may comprise determining a time during which the wind turbine is subjected to each combination of a wind speed and turbulence intensity during a load obtaining period, and specifically to each combination of wind speed, turbulence intensity and at least one of a wind shear data, a length scale turbulence and water parameter, e.g. wave direction and/or JONSWAP spectrum and/or wave height and/or wave frequency and/or tide, during a load obtaining period.

Consequently, a load indicator, e.g. loads on a wind turbine component in offshore wind turbines taking into account both wind conditions and wave conditions, may be more accurately obtained.

A partial load indicator for a specific load obtaining period may be obtained by any of the methods herein described. Determining the real accumulated fatigue may comprise obtaining the partial load indicator for the last load obtaining period and retrieving the previously obtained partial load indicators for the previous load obtaining periods from the wind turbine controller. The partial load indicator for each period can thus be stored in the wind turbine controller or in any server available for this purpose.

In cases wherein obtaining a partial load indicator comprises at least obtaining wind speed and turbulence intensity during a load obtaining period, e.g. during approximately 10 minutes, the partial load indicator and the time for each combination of wind speed and turbulence intensity may be stored in the controller or in an additional server.

After obtaining loads from the component during all of the load obtaining periods, the real accumulated fatigue in the component during the operational time is determined as represented at block 40. For determining the real accumulated fatigue, several partial load indicators, e.g. loads obtained during different periods of time, are accumulated to obtain the real accumulated fatigue during the operational time. Therefore, loads obtained from the component in a previous predetermined times may be stored in the wind turbine controller. Wind speed, turbulence intensity and the time during which a component is subjected to a specific combination of wind speed and turbulence intensity may additionally be stored.

In some examples, wind speed, turbulence intensity, wave direction, wave height, wave frequency and time during which a component is subjected to a specific combination of wind speed, turbulence intensity, wave direction, wave height and wave frequency may be stored.

In some examples, wherein loads are obtained at least from the wind speed and the turbulence intensity, real accumulated fatigue may be obtained by calculating the time during which the wind turbine is subjected to each combination of wind speed and turbulence intensity during the operational time. In this aspect, the time of each combination during a predetermined period of time may be added to the previously calculated time of each combination for previous periods so as to have the total time during which the wind turbine has been operating under a combination of wind speed and turbulence intensity during the operational time. After determining the time for each combination of wind speed and turbulence during the operational time, the real accumulated fatigue of a component or of some components may be determined.

Simulations may be used to account for different stochastics wind conditions, e.g. different turbulence profiles with same average of wind speed and turbulence, for determining the real accumulated fatigue in the wind turbine components.

In some examples, determining the real accumulated fatigue may comprise determining an equivalent fatigue load based at least on the obtained partial load indicator from the at least one wind turbine component. Equivalent fatigue load may be determined independently from the method used for obtaining a load indicator. This is to say, that a load indicator may be obtained by any of measuring directly loads in a component, estimating loads by measuring operational parameters of the wind turbine, calculating loads by measuring wind speed and turbulence and calculating loads by indirectly determining wind speed and/or turbulence. Accordingly, the several equivalent fatigue loads, each of them determined during different periods of time, i.e. for each of load obtaining periods, may be accumulated to obtain the real accumulated fatigue during the operational time. Therefore, the equivalent fatigue loads determined in previous periods may be stored in the wind turbine controller.

Equivalent fatigue loads transform variable-amplitude stress from the loads applied to a wind turbine component during a period, e.g. a time series of 10 minutes, in a single constant-amplitude stress range that would cause an equivalent damage over the same number of cycles. Equivalent fatigue load may be obtained by several methods like rainflow cycle-counting algorithm in the time domain or using spectral techniques such as Dirlik's method.

In some examples, an equivalent fatigue load may be obtained by applying a rainflow cycle-counting algorithm to the values of the loads obtained for determining the number of cycles at ranges of loads for every load obtained. Such a rainflow cycle-counting algorithm is based on determining and counting peak loads. By determining and counting the peak loads, the loads may be decomposed into various numbers of cycles of different magnitudes. Then, equivalent fatigue loads for a period, e.g. for a load obtaining period, may be obtained.

In alternative examples, an equivalent fatigue load may be obtained by applying e.g. Dirlik's method. In this method, a real power spectral density of loads for the at least one component during a load obtaining period may be calculated. The real power spectral density of each load applied to at least one component is then calculated and weighted using a probability density function. Then, an equivalent fatigue load may be obtained. Methods of calculating an equivalent fatigue load based on spectral analysis, e.g. Dirlik's method, are less precise than those based on the time domain. However, these methods do not require an enormous computing power to implement it in real-time in a wind turbine as in rainflow cycle-counting algorithm method. Therefore, Dirlik's method may be simpler and cheaper than methods based on time domain. A comparison of time-domain and spectral methods may be found for example in P. Ragan and L. Manuel, Comparing Estimates of Wind Turbine Fatigue Loads using Time-Domain and Spectral Methods, Wind Engineering Volume 31, No. 2, 2007.

In some examples, determining an equivalent fatigue load may comprise determining a damage equivalent load and/or a load duration distribution.

In some examples, determining a real accumulated fatigue may take into account some events such as start-ups, shut-downs or grid-loss, since these events may increase the fatigue.

In some examples, the method of operating a wind turbine may additionally comprises determining the nacelle orientation. In this way, the real accumulated fatigue may be at least based on the obtained load indicator and on the nacelle orientation. This may be particularly relevant in those cases during which the partial load indicator is obtained from the wind speed and the intensity turbulence. In this way, the direction of loads on a wind turbine component may be determined and the real accumulated fatigue may thus be more precisely determined.

At block 50, the real accumulated fatigue, i.e. determined from the real loads, and the reference accumulated fatigue are compared.

Then, at block 60 the operation of the wind turbine is controlled based at least on a result of comparing the accumulated fatigue and the reference accumulated fatigue in the at least one wind turbine component.

The wind turbine operation may thus be adapted according to the result of such a comparison.

In some examples, a reference accumulated fatigue trend may be obtained. The reference accumulated fatigue trend may be obtained for example from simulations. The reference accumulated fatigue trend is a line or a curve that indicates the evolution of theoretical fatigue loads (with or without a safety factor) from when the component theoretically starts to operate to the end of the design lifetime.

The method of operating a wind turbine may comprise comparing a trend of the real accumulated fatigue and the reference accumulated fatigue trend.

A reference accumulated fatigue at operational time may thus be determined based at least on the reference accumulated fatigue trend and on the operational time of the at least one wind turbine component.

Therefore, the method of operating a wind turbine may comprise determining a reference accumulated fatigue at operational time of the at least one wind turbine component based at least on the operational time and on the reference accumulated fatigue trend of the at least one wind turbine component.

According to this aspect, not only the status of the component with respect to the reference accumulated fatigue at design lifetime is determined, but also the status of the component with respect to the reference accumulated fatigue at operational time is determined, i.e. the reference accumulated fatigue expected for this operational time.

Such a reference accumulated fatigue at operational time may be calculated by interpolating the magnitude of the reference accumulated at design lifetime, e.g. 20 years, or by determining the magnitude of the reference accumulated fatigue trend corresponding to an operational time, e.g. 5 years.

In cases wherein the reference accumulated fatigue trend is greater than the real accumulated fatigue, the wind turbine may be operated more aggressively, in order to increase the output power since the real fatigue is less than the expected. In these examples, the reference accumulated fatigue at operational time in the wind turbine component is also greater than the real accumulated fatigue.

Therefore, in some examples, controlling the operation of a wind turbine may comprise uprating the wind turbine when the reference accumulated fatigue trend is greater the real accumulated fatigue.

When a wind turbine is uprated, the wind turbine is controlled to yield more energy, at the expense of higher loads. In this way, the pitch angle may be adjusted in order to receive higher loads which imply both higher output power and higher loads. In some examples, such an uprating strategy may be maintained while the real accumulated fatigue in the component, or of the all selected components, is keep under the reference accumulated fatigue trend. The power production may thus be increased.

In some examples, the inclination of the reference accumulated fatigue trend and the inclination of the real accumulated fatigue during a specific period of the operational time may also be calculated. Comparing these inclinations, malfunction of the component may be early detected.

Additionally or alternatively, the method may comprise extending the lifetime of the at least one wind turbine component when the reference accumulated fatigue at design lifetime, e.g. the theoretical accumulated fatigue at the end of the design lifetime having a safety factor, is greater than the real accumulated fatigue. The lifetime of the component may be extended while the real accumulated fatigue is still lower than the reference accumulated fatigue at design lifetime, e.g. a threshold value of the theoretical accumulated fatigue or while the trend of the real accumulated fatigue is lower than the reference accumulated fatigue trend. As a result, the output power and the availability may be increased, and cost of energy of the wind turbine may thus be reduced.

In cases wherein the accumulate fatigue of the wind turbine component exceeds the reference accumulated fatigue trend, the operation of the wind turbine can be adjusted. Exceeding the reference accumulated fatigue implies that the reference accumulated fatigue at operational time is also lower than the real accumulated fatigue.

In some examples, the method may comprise derating the wind turbine for reducing the loads of the at least one wind turbine component when the real accumulated fatigue exceeds or is greater than the reference accumulated fatigue trend.

When a wind turbine is de-rated, the pitch angle is adjusted for reducing loads on the wind turbine, e.g. reducing the thrust, and consequently on the wind turbine component or components. Such a load reduction implies a reduction of output power. In some examples, rotational speed of the generator or torque may be reduced.

In some examples, controlling the operation of the wind turbine may comprise performing a maintenance operation of the at least one wind turbine component when the real accumulated fatigue exceeds the reference accumulated fatigue at design lifetime, e.g. a threshold value of the theoretical accumulated fatigue at the design lifetime. As a result, unexpected failures of the components may be avoided in advance. Therefore, the availability of wind turbine may be improved.

Additionally or alternatively, the method may comprise performing maintenance operation when the real accumulated fatigue is greater than the reference accumulated fatigue trend.

In some examples, a maintenance operation may be repairing the component or a part of the component. In other examples, a maintenance operation may be replacing or substituting the component or a part of the component.

Figure 4:
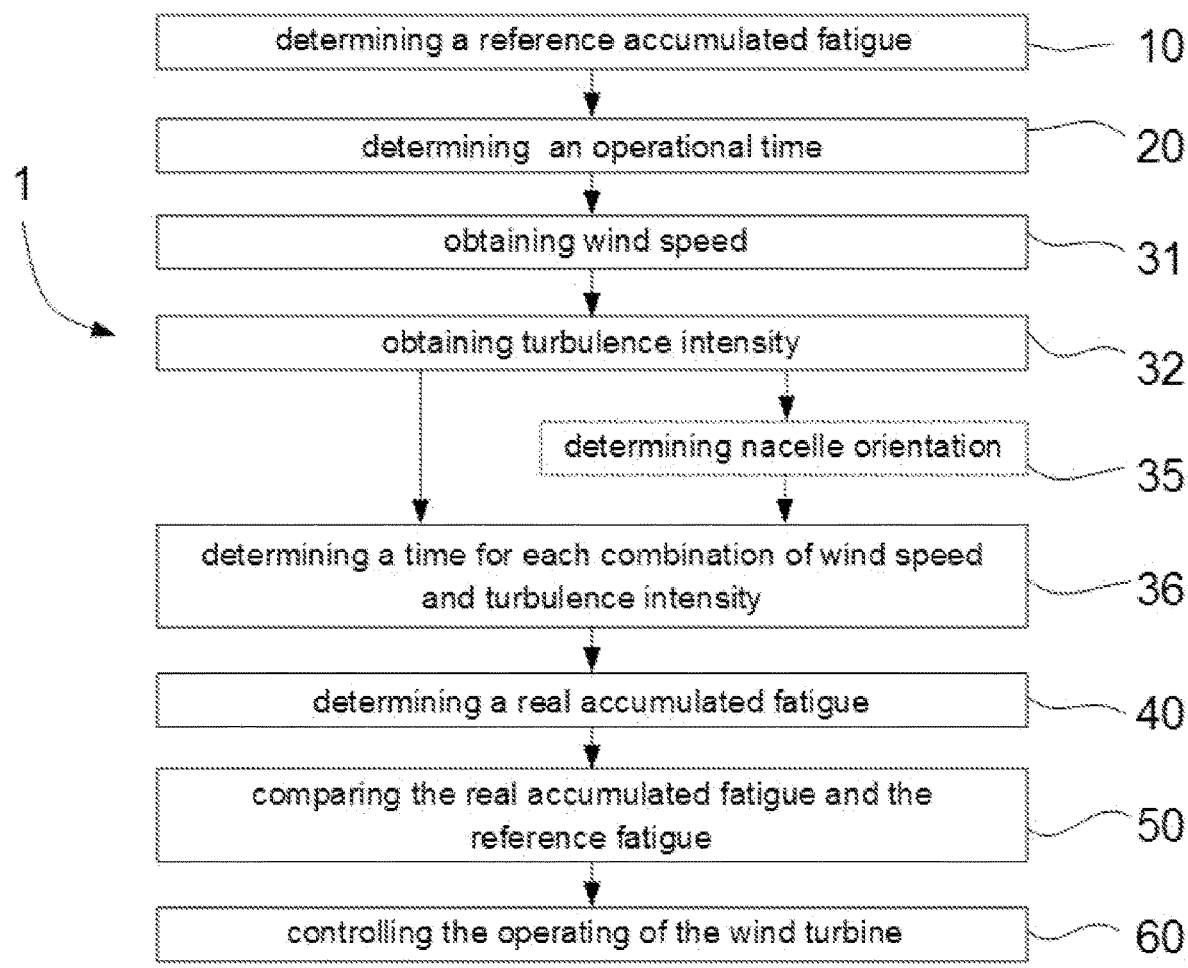
FIG. 4 shows a flow diagram of an example of a method of operating a wind turbine.

FIG. 4 shows a flow diagram of a method of operating a wind turbine 200 according to one example.

As in FIG. 3, at block 10, a reference accumulated fatigue of at least one wind turbine component is determined. At block 20 an operational time of at least one wind turbine component is determined. At block 31 and 32, obtaining wind speed and obtaining turbulence intensity are respectively represented. A time during which the wind turbine is subjected to each combination of the at least wind speed and turbulence intensity during an operational time is determined at block 36. Block 35 is optional. At block 35, a nacelle orientation may be determined. The nacelle orientation may be determined by the wind turbine controller e.g. by comparing the nacelle orientation and a fixed point. According to FIG. 4, blocks 31, 32 and 36, and optionally 35, enable to obtain a load indicator from a wind turbine component. At block 40, a real accumulated fatigue, i.e. the real time accumulated fatigue, based at least on the determined time for each combination of at least wind speed and turbulence intensity during the operational time, and optional including the nacelle orientation is determined.

As described with respect to FIG. 3, at block 50 the real accumulated fatigue and the theoretical accumulated fatigue are compared, and at block 60 the operation of the wind turbine is controlled based at least on a result of such a comparison.

Wind speed and turbulence intensity may be obtained by any of the methods described with respect to the FIG. 3. After obtaining the series of wind speeds and turbulence intensities during a period of time, e.g. a load obtaining period, the method may comprise determining a time during which the wind turbine is subjected to each combination of wind speed and turbulence intensity during an operational time. In FIG. 4, this comprises adding the times of each combination of at least wind speed and turbulence intensity during the period of time to the previously calculated times of each combination of at least wind speed and turbulence intensity in such a way that a total time of each combination of wind speed and turbulence intensity may be determined for the operational time, e.g. since the installation of the component. These operations may be calculated using a matrix and/or a look-up table. Then, the time of each combination of wind speed and turbulence is determined, and consequently an accumulated load indicator is obtained. In this aspect, loads that have been acting on the wind turbine component during the operational time may be obtained in a similar way as obtained using a predefined Weibull distribution for a given wind speed as described in IEC 64100-1 ed. 4. However, instead of using a predefined Weibull distribution, real time wind speed and turbulence intensity are taking into account. Accordingly, loads are more precisely calculated, and the load indicator is thus more precisely obtained.

In this aspect, determining the total time during which the wind turbine is operating under a specific combination of at least wind speed and turbulence intensity, represents or indicates the loads, i.e. an accumulated load indicator, during which the wind turbine has been subjected to during the operational time of the component.

Optionally, the orientation of the nacelle may be determined and may be an input for obtaining the load indicator. In this way, the matrix may also store the orientation of the nacelle for each combination of wind speed and turbulence. Therefore, the effect of the wind speed and the turbulence on the wind turbine component(s) may be more accurately determined.

Figure 5:
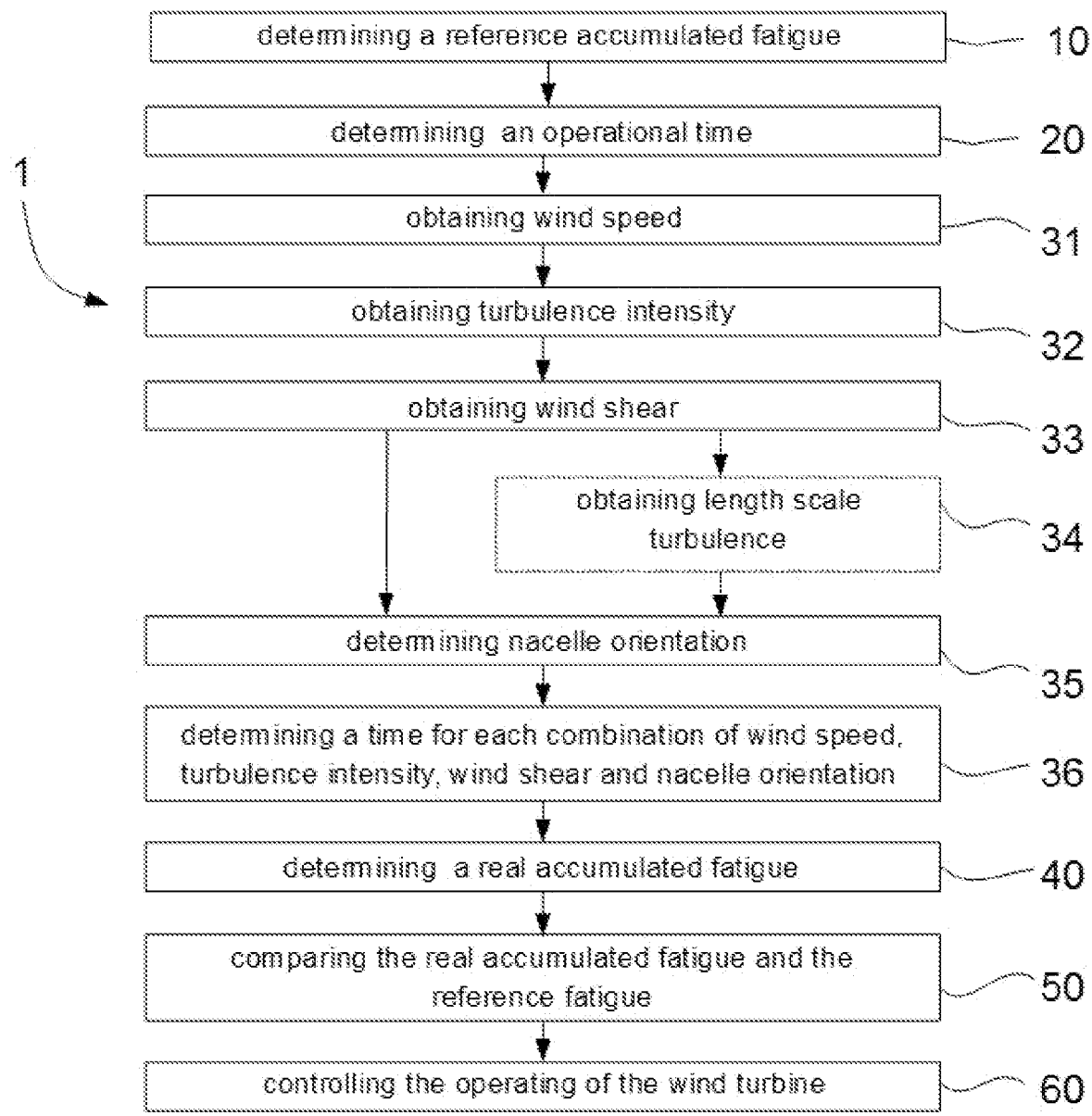
FIG. 5 shows a flow diagram of an example of a method of operating a wind turbine.

FIG. 5 shows a flow diagram of an example a method of operating a wind turbine 1.

In the method represented in FIG. 5, in addition to obtaining wind speed at block 31 and turbulence intensity at block 32, the method further comprises obtaining wind shear at block 33, and determining the nacelle orientation at block 35. The method optionally comprises obtaining length scale turbulence at block 34. As described with respect to the FIG. 4, at block 36, the method comprises determining a time during which the wind turbine is subjected to each combination of at least wind speed, turbulence intensity, wind shear and a nacelle orientation. Optionally, such a combination may additionally comprise length scale turbulence.

In other examples, wind speed, turbulence intensity, length scale turbulence and a nacelle orientation may be obtained. The method therefore comprises determining a time during which the wind turbine is subjected to each combination of at least wind speed, turbulence intensity, length scale turbulence and nacelle orientation.

Taking into account the wind shear and the length scale turbulence for determining the loads during which a wind turbine is subjected to, enhances the accuracy for obtaining a fatigue load acting on wind turbine components.

In some examples, the method of operation a wind turbine may comprise a method of determining fatigue in a wind turbine component according to any of the examples herein described.

In a further aspect, a method of determining fatigue in a wind turbine component is provided.

Figure 6:
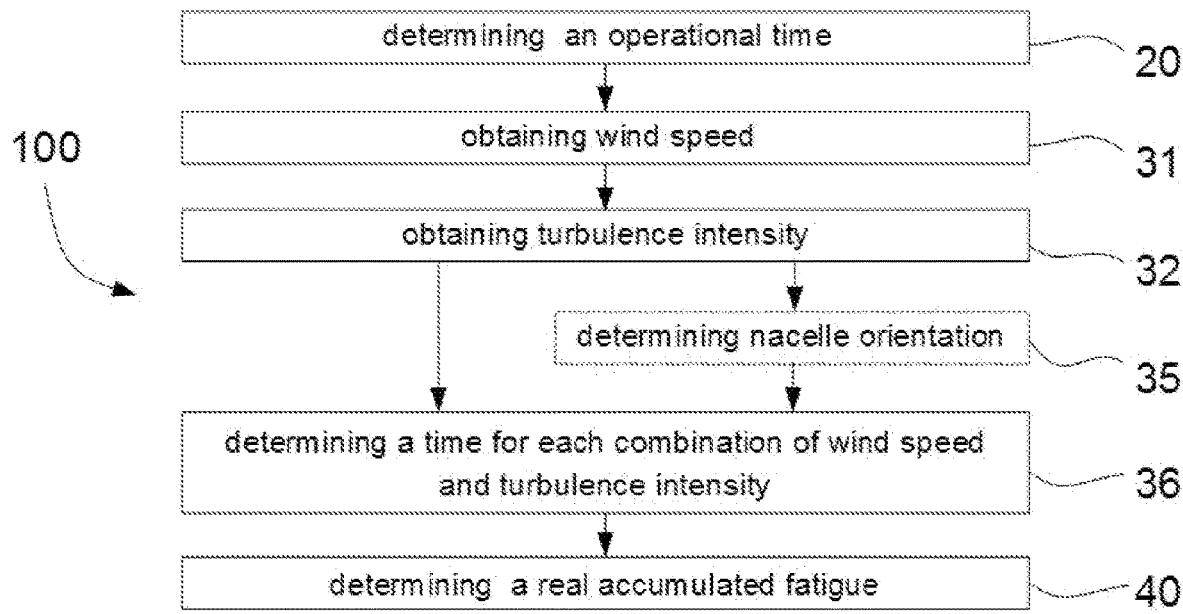
FIG. 6 shows a flow diagram of an example of a method of determining fatigue in a wind turbine component.

FIG. 6 shows a flow diagram representing a method of determining 100 fatigue in a wind turbine component according to one example. At block 20, the method comprises determining an operational time of at least a wind turbine component having a plurality of load obtaining periods. The method further comprises obtaining wind speed for each of the loads obtaining periods at block 31 and obtaining turbulence intensity for each of the load obtaining periods at block 32. Combinations of wind speed and turbulence intensity for each of the load obtaining periods are determined. In addition, the method comprises at block 36 times for each of the combinations of wind speed and turbulence intensity during the operational time.

In some examples, these times may be determined by accumulating the time during which the wind turbine is subjected to each of at least wind speed and turbulence intensity determined for different load obtaining periods during the operational time. The operational time may be divided into different load obtaining periods. Therefore, the total time during which the turbine is subjected to a specific combination of wind speed and turbulence intensity during the operational time is the accumulation of partial times during the different load obtaining periods.

Block 35 is optional. A nacelle orientation is determined at block 35. Wind speed, turbulence intensity and nacelle orientation may be obtained according to any of the examples herein disclosed.

In addition, at block 40, the method comprises determining a real accumulated fatigue of the wind turbine component, based at least on the determined times for the combinations of wind speed and turbulence intensity, and optional including the nacelle orientation. Real accumulated fatigue of the wind turbine component may be determined according to any of the examples herein disclosed. In some examples, determining the real accumulated fatigue of the component may comprise accumulating, e.g. adding, times for each combination of wind speed and turbulence intensity determined for the load obtaining periods.

In some examples, a method of determining a real accumulated fatigue in a wind turbine component may further comprises obtaining a wind shear and/or length scale turbulence similarly as described with respect to the method represented in FIG. 5. In these examples, determining a time for each combination of wind speed and turbulence intensity additionally comprises at least one of the nacelle orientation, wind shear and length scale turbulence.

In some examples, a method of determining a real accumulated fatigue in a wind turbine component may further comprise obtaining a wave direction and/or wave height and/or a wave frequency in a similar way as previously described.

Figure 7:
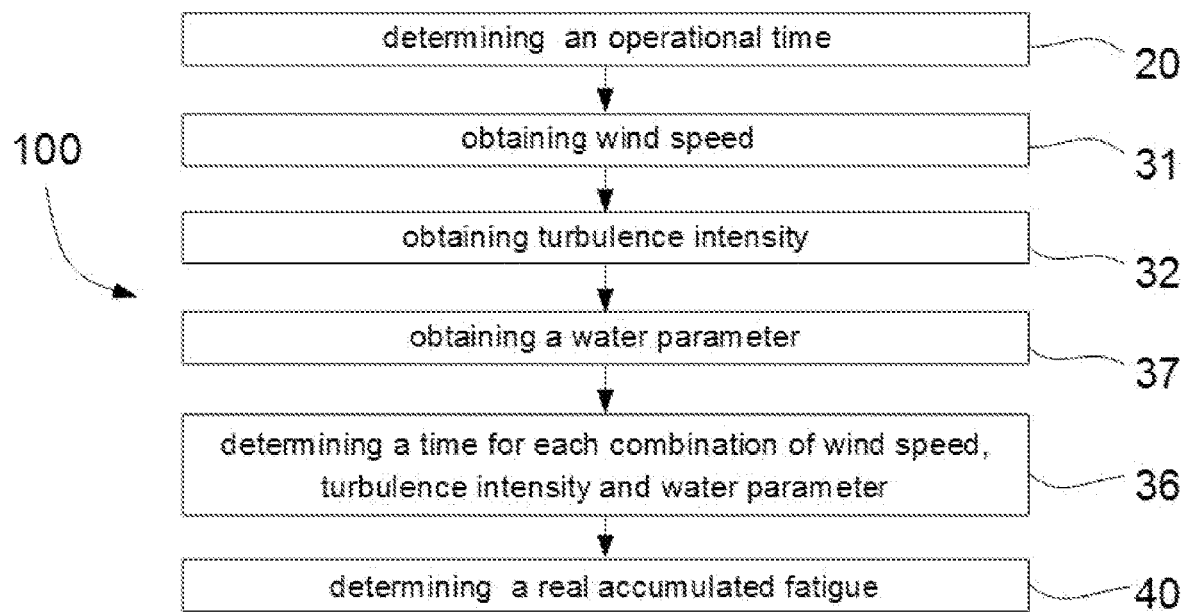
FIG. 7 shows a flow diagram of an example of a method of determining fatigue in a wind turbine component.

FIG. 7 shows a flow diagram representing a method of determining 100 fatigue in a wind turbine component according to one example. At block 20, the method comprises determining an operational time of at least a wind turbine component having a plurality of load obtaining periods. The method further comprises obtaining wind speed for each of the loads obtaining periods at block 31, obtaining turbulence intensity for each of the load obtaining periods at block 32 and obtaining at least one water parameter at block 37. Combinations of wind speed, turbulence intensity and at least one water parameter for each of the load obtaining periods are determined. In addition, the method comprises at block 36 times for each of the combinations of wind speed, turbulence intensity and at least one water parameter during the operational time.

A water parameter may be at least one of a wave direction, JONSWAP spectrum, a wave height, wave frequency and tide.

In some examples, combinations of wind speed, turbulence intensity, wave direction, wave height and wave direction may be determined. The method may further comprise times for each of the combinations of wind speed, turbulence intensity, JONSWAP spectrum and wave direction during the operational time.

In some examples, wind shear and/or length scale may also be taken into account. In this aspect, determining fatigue in a wind turbine component may comprise determining combinations of wind speed, turbulence intensity, at least one water parameter, e.g. wave direction and/or JONSWAP spectrum and/or wave height and/or wave frequency and/or tide, and at least one of wind shear data and length scale turbulence for each of the load obtaining periods. In addition, the method may comprise determining times for each of the combinations of wind speed, turbulence intensity, at least one water parameter, e.g. wave direction and/or JONSWAP spectrum wave height and/or wave frequency and/or tide, and at least one of wind shear data and length scale turbulence during the operational time. The method may additionally comprise determining a real accumulated fatigue in the wind turbine component based at least on the determined times for these combinations.

In a further aspect, a method of performing a maintenance operation on a wind turbine component is provided. The method comprises determining a reference accumulated fatigue of the wind turbine component and determining an operational time of the wind turbine component comprising load obtaining periods. In addition, the method comprises obtaining a partial load indicator from the wind turbine component for each of the load obtaining periods and determining a real accumulated fatigue in the wind turbine component comprising obtaining an accumulated load indicator by adding the partial load indicators of each of the load obtaining periods. The real accumulated fatigue and the reference accumulated fatigue are compared. The method further comprises performing a maintenance operation on the wind turbine component when the real accumulated fatigue exceeds the reference accumulated fatigue, specifically substituting the wind turbine component.

In some examples, determining a reference accumulated fatigue in the wind turbine component comprises determining a reference accumulated fatigue at design lifetime. In these examples, the real accumulated fatigue and the reference accumulated fatigue at design lifetime may be compared. A maintenance operation is performed when the real accumulated fatigue exceeds the reference accumulated fatigue at design lifetime. In these examples, the reference accumulated fatigue at design lifetime comprises a safety factor.

In some examples, determining a reference accumulated fatigue in the wind turbine additionally comprises determining a reference accumulated fatigue trend.

In some examples, a maintenance operation may be repairing the component or a part of the component. In other examples, a maintenance operation may be replacing or substituting the component or a part of the component.

In a yet further aspect, a wind turbine controller (240 in FIG. 1) configured to perform any of the methods of operating a wind turbine or of performing a maintenance operation on a wind turbine component herein described is provided. The wind turbine controller is configured to determine an operational time of at least one wind turbine component comprising load obtaining periods and to obtain a partial load indicator from the at least one wind turbine component for each of the load obtaining periods. In addition, the wind turbine controller is configured to determine a real accumulated fatigue in the at least one wind turbine component by obtaining an accumulated load indicator by adding the partial load indicators of the load obtaining periods, by e.g. storing the data of previous periods. The wind turbine control is further configured to obtain a reference accumulated fatigue of the at least one wind turbine component. Furthermore, the wind turbine controller is configured to compare the real accumulated fatigue and the reference accumulated fatigue and controlling the operation of the wind turbine based at least on the result of comparing the accumulated fatigue and the reference accumulated fatigue by e.g. sending a signal to the pitch controller or sending a message to an user for scheduling a maintenance operation. This maintenance alarm may be generated by the wind turbine controller or by a server connected to a SCADA storing all wind turbine data.

The wind turbine controller may include one or more processor(s) and associated memory device(s) configured to perform a variety of computer-implemented functions (e.g., performing the methods, steps, calculations and the like and storing relevant data as disclosed herein) according to any of the methods herein described. According to this aspect, the controller may perform various different functions, such as receiving, transmitting and/or executing wind turbine control signals, e.g. determining an operational time, obtaining a reference accumulated fatigue or determining a real accumulated fatigue. In addition, the controller may also control the operation of the wind turbine. For example, the controller may be configured to control the blade pitch or pitch angle of each of the blades to control the power output generated by the wind turbine by adjusting an angular position of at least one blade relatively to the wind. As a result, the operation of the wind turbine may be up-rated or de-rated.

The controller may also include a communications module to facilitate communications between the controller and the components of the wind turbine. Further, the communications module may include a sensor interface (e.g., one or more analog-to-digital converters) to permit signals transmitted from one or more sensors to be converted into signals that can be understood and processed by the processors. It should be appreciated that the sensors may be communicatively coupled to the communications module using any suitable means as for example a wired connection or a wireless connection. As such, the processor may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

It should also be understood that any number or type of sensors may be employed within the wind turbine 200 and at any location and are according to any of the examples herein disclosed.

In some examples, the wind turbine controller is further configured to obtain wind speed and turbulence intensity. The wind turbine controller may determine the wind speed from a rotational speed of the wind turbine rotor measured by a sensor or by a group of sensors. Turbulence intensity may be determined by the wind turbine controller from a LIDAR, which may send a signal to the control or from ripples of a rotational speed of the wind turbine rotor or the generator rotor measured by a sensor. In some of these examples, the wind turbine controller may be communicatively coupled to sensors for obtaining wind speed or turbulence intensity. In addition, the wind turbine controller may be communicatively coupled to sensors for obtaining any of the water parameters herein described and/or wind shear and/or length scale turbulence.

This written description uses examples to disclose the invention, including the preferred embodiments, and also to enable any person skilled in the art to practice the invention, including making and using any devices or systems and performing any incorporated methods. The patentable scope of of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of operating a wind turbine, the method comprising:
   generating a reference accumulated fatigue trend, the reference accumulated fatigue trend being a curve or line indicating an accumulation of theoretical expected fatigue loads that at least one wind turbine component is expected to withstand during a design lifetime thereof;
   determining a reference accumulated fatigue of at least one wind turbine component using the reference accumulated fatigue trend and a reference operational time;
   determining an actual operational time of at least one wind turbine component comprising load obtaining time periods;
   obtaining wind speed for each of the plurality of load obtaining time periods;
   obtaining turbulence intensity for each of the plurality of load obtaining time periods;
   grouping pairs of the wind speed and the turbulence intensity together for each of the plurality of load obtaining time period;
   determining a time during which the at least one wind turbine component is subjected to each of the pairs of the wind speed and the turbulence intensity for each of the plurality of load obtaining time period;
   obtaining a partial load indicator from the at least one wind turbine component for each of the load obtaining time periods based on the pairs of the wind speed and the turbulence intensity and the time during which the at least one wind turbine component is subjected to each of the pairs of the wind speed and the turbulence intensity for each of the plurality of load obtaining time period;
   calculating an actual fatigue load in the at least one wind turbine component by adding the partial load indicators from each of the load obtaining time periods;
   comparing the actual fatigue load and the reference accumulated fatigue; and
   controlling operation of the wind turbine based at least on a result of comparing the actual fatigue load and the reference accumulated fatigue.

2. The method of claim 1, wherein obtaining the wind speed comprises determining the wind speed from at least one of a pitch angle, an electrical power output, a rotational velocity of a wind turbine rotor and a torque of a wind turbine rotor.

3. The method of claim 1, wherein obtaining the turbulence intensity comprises determining the turbulence intensity from ripples of a rotational velocity of a wind turbine rotor or a generator rotor.

4. The method of claim 1, wherein obtaining the partial load indicator from the at least one wind turbine component further comprises:
   obtaining wind shear data; and
   wherein calculating the actual fatigue load of the at least one wind turbine component during each of the load obtaining time periods is further based on the obtained wind shear data.

5. The method of claim 1, wherein obtaining the partial load indicator from the at least one wind turbine component further comprises:
   obtaining length scale turbulence; and
   wherein calculating the actual fatigue load of the at least one wind turbine component during each of the load obtaining time periods is further based on the obtained length scale turbulence.

6. The method of claim 1, wherein obtaining the partial load indicator from the at least one wind turbine component further comprises:
   obtaining a water parameter comprising at least one of wave direction, JONSWAP spectrum, wave height, wave frequency and tide,
   wherein calculating the actual fatigue load of the at least one wind turbine component during each of the load obtaining time periods is further based on the obtained water parameter.

7. The method of claim 1, wherein obtaining the partial load indicator further comprises determining a nacelle orientation.

8. The method of claim 1, wherein the reference operational time is design lifetime.

9. The method of claim 8, wherein controlling the operation of the wind turbine further comprises:
   performing a maintenance operation on the at least one wind turbine component when the actual fatigue load exceeds the reference accumulated fatigue at the design lifetime.

10. The method of claim 8, wherein controlling the operation of the wind turbine further comprises:
    extending an expected lifetime of the at least one wind turbine component when the reference accumulated fatigue at the design lifetime is greater than the actual fatigue load.

11. The method of claim 1, wherein controlling the operation of the wind turbine comprises:
    de-rating the wind turbine for reducing loads on the at least one wind turbine component when the actual fatigue load exceeds the reference accumulated fatigue trend.

12. The method of claim 1, wherein controlling the operation of a wind turbine further comprises:
    uprating the wind turbine when actual fatigue load is lower than the reference accumulated fatigue trend.

13. A method of determining fatigue in a wind turbine component, the method comprising:
    determining an operational time of the wind turbine component having a plurality of load obtaining time periods;
    obtaining wind speed for each of the plurality of load obtaining time periods;
    obtaining turbulence intensity for each of the plurality of load obtaining time periods;
    grouping a plurality of pairs of wind speed and turbulence intensity together for each of the plurality of loads obtaining time periods;
    determining a time during which the at least one wind turbine component is subjected to each of the pairs of the wind speed and the turbulence intensity for each of the plurality of load obtaining time period;
    adding the determined times during which the at least one wind turbine component is subjected to each of the pairs of the wind speed and the turbulence intensity for each of the plurality of load obtaining time period to obtain a total time of each of the wind speed and the turbulence intensity for the operational time; and
    determining an actual fatigue load in the wind turbine component based at least on the total time of each of the plurality of pairs of wind speed and turbulence intensity.

14. The method of claim 13, wherein the method comprises:
    obtaining wind shear data;
    grouping combinations of wind speed, turbulence intensity and the wind shear data for each of the load obtaining time periods; and
    determining times for each of the combinations of wind speed, turbulence intensity, the wind shear for each of the plurality of load obtaining time periods during the operational time.

15. The method of claim 14, further comprising:
    obtaining length scale turbulence;
    grouping combinations of the wind speed, the turbulence intensity, the wind shear, and the length scale turbulence; and
    determining times for each of the combination of the wind speed, the turbulence intensity, the wind shear data and the length scale turbulence during the operational time.

16. A method of performing a maintenance operation on a wind turbine component, the method comprising:
    generating a reference accumulated fatigue trend, the reference accumulated fatigue trend being a curve or line indicating an accumulation of theoretical expected fatigue loads that at least one wind turbine component is expected to withstand during a design lifetime thereof;
    determining a reference accumulated fatigue of the wind turbine component using the reference accumulated fatigue trend and a reference operational time;
    determining an operational time of the wind turbine component comprising load obtaining time periods;
    obtaining wind speed for each of the plurality of load obtaining time periods;
    obtaining turbulence intensity for each of the plurality of load obtaining time periods;
    grouping pairs of the wind speed and the turbulence intensity together for each of the plurality of load obtaining time period;
    determining a time during which the at least one wind turbine component is subjected to each of the pairs of the wind speed and the turbulence intensity for each of the plurality of load obtaining time period;
    obtaining a partial load indicator from the at least one wind turbine component for each of the load obtaining time periods based on the pairs of the wind speed and the turbulence intensity and the time during which the at least one wind turbine component is subjected to each of the pairs of the wind speed and the turbulence intensity for each of the plurality of load obtaining time period;
    calculating an actual fatigue load in the wind turbine component by adding the partial load indicators from each of the load obtaining time periods;
    comparing the actual fatigue load and the reference accumulated fatigue; and performing a maintenance operation on the wind turbine component when the actual fatigue load exceeds the reference accumulated fatigue, specifically substituting the wind turbine component.

\* \* \* \* \*